United States Patent
Yamada et al.

(10) Patent No.: US 6,524,218 B1
(45) Date of Patent: Feb. 25, 2003

(54) AUXILIARY MACHINERY DRIVER FOR CAR

(75) Inventors: Yoshiaki Yamada, Ageo (JP); Jun Yamada, Ageo (JP); Masakazu Sasaki, Ageo (JP)

(73) Assignee: Nissan Diesel, Co., Ltd., Saitama (JP)

( * ) Notice: Subject to any disclaimer, the term of this patent is extended or adjusted under 35 U.S.C. 154(b) by 0 days.

(21) Appl. No.: 09/807,532
(22) PCT Filed: Mar. 24, 1999
(86) PCT No.: PCT/JP99/01495
§ 371 (c)(1), (2), (4) Date: Jul. 24, 2001
(87) PCT Pub. No.: WO00/21775
PCT Pub. Date: Apr. 20, 2000

(30) Foreign Application Priority Data

Oct. 15, 1998 (JP) .................................. 10-293672

(51) Int. Cl.[7] .............................................. B60K 41/02
(52) U.S. Cl. ................................ 477/5; 477/8; 477/13; 180/65.1; 192/3.56
(58) Field of Search .................. 477/2, 3, 5, 6, 477/7, 8, 12, 13, 175, 906; 192/3.56; 74/15.86, 15.88; 180/65.1, 65.4, 65.6, 65.8

(56) References Cited

U.S. PATENT DOCUMENTS

| | | | |
|---|---|---|---|
| 4,132,132 A | * | 1/1979 | Shaffer .................. 74/15.86 X |
| 4,315,439 A | * | 2/1982 | Grachtrup .................. 477/2 X |
| 5,635,805 A | * | 6/1997 | Ibaraki et al. .............. 180/65.4 |
| 6,024,667 A | * | 2/2000 | Krohm et al. ............... 477/6 X |
| 6,048,288 A | * | 5/2000 | Tsujii et al. ................ 180/65.4 |
| 6,123,642 A | * | 9/2000 | Saito et al. ..................... 477/3 |

FOREIGN PATENT DOCUMENTS

| | | | |
|---|---|---|---|
| JP | 363255136 | * 10/1988 | ................. 477/906 |
| JP | 4-75402 | 3/1992 | |
| JP | 5-336602 | 12/1993 | |
| JP | 8-079915 | 3/1996 | |
| JP | 9-215101 | 8/1997 | |
| JP | 10-21907 | 2/1998 | |
| JP | 10-075502 | 3/1998 | |

* cited by examiner

Primary Examiner—Charles A Marmor
Assistant Examiner—Ha Ho
(74) Attorney, Agent, or Firm—Rabin & Berdo, P.C.

(57) ABSTRACT

A vehicle has a power extraction mechanism 8, 9, 10a, 10b, 10c, which transmits the rotation of the power transmission mechanism to the auxiliary machines 20, 21, a solenoid clutch 11, which enables or disables the transmission of rotation to the auxiliary machines by the power extraction mechanism, and a determination device 30, 31, 32, which determines whether a control system of the motor 22 for auxiliary machines is operating abnormally or normally. The solenoid clutch 11 is maintained in a disengaged state when the control system of the motor 22 for the auxiliary machines is operating normally. In contrast, when an abnormality is detected in the control system, the auxiliary machines are driven by the rotational force of the power transmission mechanism because the solenoid clutch 11 is engaged at that time. In this manner, it is possible to maintain normal operation of the vehicle by driving the auxiliary machines even when there is an abnormality in the control system.

9 Claims, 2 Drawing Sheets

| ROTATION SENSOR DETECTION VALUE | STOP/ ROTATE | ROTATE | STOP |
|---|---|---|---|
| VEHICLE SPEED SENSOR DETECTION VALUE | STOP | RUN | RUN |
| CONTROLLER DETERMINATION | NORMAL | NORMAL | ABNORMAL |
| SOLENOID CLUTCH | DISENGAGE | DISENGAGE | ENGAGE |

AUXILIARY MACHINERY DRIVER FOR CAR

FIELD OF THE INVENTION

This invention relates to a drive device which drives an auxiliary machine such as an oil pump or an air compressor used when a vehicle is running, the auxiliary machine being powered by a prime mover mounted in the vehicle.

BACKGROUND OF THE INVENTION

Tokkai-Hei-10-75502 and Tokkai-Hei-10-51907 published by the Japanese Patent Office in 1998 disclose a hybrid vehicle provided with an engine and a motor which act as a prime mover for driving the vehicle. Since a hybrid vehicle stops the engine and runs only on the drive force of the motor in certain cases, an arrangement which drives an auxiliary machine only with the motive power of the engine can not be applied to a hybrid vehicle, the auxiliary machine such as an oil pump or an air compressor being used ordinarily when the vehicle is operating. Therefore, generally the motor drives the auxiliary machines described above in the hybrid vehicle. In this vehicle, an oil pump is used to generate an oil pressure which is supplied to a power steering device and an air compressor is used to generate an air pressure which is supplied to the braking system or the like. When there is an abnormality such as a malfunction in the motor system which drives the auxiliary machine, vehicle performance is compromised due to a lowering of oil pressure or air pressure.

DISCLOSURE OF THE INVENTION

The present invention has the object of maintaining the operation of an auxiliary machine when the vehicle is running, in the event of a malfunction in the motor system for driving the auxiliary machine.

In order to achieve the above object, the present invention provides a drive device for an auxiliary machine in a vehicle, the vehicle comprising a motor acting as a prime mover for the vehicle, a power transmission mechanism which transmits the output of the motor to the vehicle drive wheels and a motor for the auxiliary machine which powers the auxiliary machine in the vehicle. The drive device for the auxiliary machine in the vehicle comprises a power extraction mechanism which transmits a rotation of the power transmission mechanism to a drive shaft of the auxiliary machine, a solenoid clutch which enables or disables the transmission of the rotation to the auxiliary machine by the power extraction mechanism, a determination device for determining whether a control system of the motor for the auxiliary machine (including the motor for the auxiliary machine itself) is normal or abnormal, and a solenoid clutch control device which disengages the solenoid clutch when it is determined by the determination device that the control system of the motor for the auxiliary machine is operating normally and which engages the solenoid clutch when it is determined that the control system of the motor for the auxiliary machine is operating abnormally.

While the control system of the motor for the auxiliary machine is operating normally when the vehicle is running, the auxiliary machine is driven by the motor for the auxiliary machine because the solenoid clutch control device maintains the disengagement of the solenoid clutch. In contrast, when an abnormality occurs in the control system of the motor for the auxiliary machine when the vehicle is running (for example, a short circuit or a break in the cable supplying electrical power to the motor for the auxiliary machine, or an abnormality such as seizing of the rotation of the motor for the auxiliary machine), the abnormality is detected by the abnormality determination device. When the abnormality is detected in this manner, the rotation from the power transmission mechanism is transmitted through the power extraction mechanism to the drive shaft of the auxiliary machine such as an air compressor or an oil pump for power steering since the solenoid clutch control device engages the solenoid clutch.

In this manner, when there is an abnormality in the control system of the motor for the auxiliary machine, it is possible to maintain supply of oil pressure to the power steering device or of air pressure to the vehicle braking device because the auxiliary machine is operated by the drive force of the motor for driving the vehicle.

Another drive device is provided for an auxiliary machine in a vehicle, the vehicle comprising a motor acting as a prime mover for the vehicle, a power transmission mechanism which transmits the output of the motor to the vehicle drive wheels and a motor for the auxiliary machine which powers the auxiliary machine in the vehicle.

This drive device for the auxiliary machine in the vehicle comprises a spare auxiliary machine, a power extraction mechanism which transmits a rotation of the power transmission mechanism to the spare auxiliary machine, a solenoid clutch which enables or disenables the transmission of the rotation to the spare auxiliary machine by the power extraction mechanism, a determination device for determining whether a control system of the motor for the auxiliary machine (including the motor for the auxiliary machine itself) is normal or abnormal, and a solenoid clutch control device which disengages the solenoid clutch when it is determined by the determination device that the control system of the motor for the auxiliary machine is operating normally and which engages the solenoid clutch when it is determined that the control system of the motor for the auxiliary machine is operating abnormally.

While the control system of the motor for the auxiliary machine is operating normally when the vehicle is running, the auxiliary machine is driven by the motor for the auxiliary machine because the solenoid clutch control device maintains the disengagement of the solenoid clutch. In contrast, when the abnormality determination device determines that there is an abnormality in the control system of the motor for the auxiliary machine when the vehicle is running, the solenoid clutch control device engages the solenoid clutch and drives the spare auxiliary machine with the power transmission mechanism through the power extraction mechanism. In this manner, when there is an abnormality in the control system of the motor for the auxiliary machine, it is possible to continue supply of oil pressure to the power steering device or air pressure to the vehicle braking device by operating the spare auxiliary machine.

It is possible to provide a structure in which the solenoid clutch control device can forcibly engage the solenoid clutch even when there is not an abnormality in the control system of the motor for the auxiliary machine. When the control system of the motor for the auxiliary machine is operating normally, the auxiliary machine such as an oil pump or an air compressor is driven by the motor for the auxiliary machine. When the solenoid clutch is forcibly engaged, the spare oil pump or the spare air compressor is driven by the motor for driving the vehicle in addition to the auxiliary machine. Thus the output of the oil pump and the air pump is increased and it is possible to increase the working pressure of the braking device and the power steering.

In both the above inventions, the determination device for determining whether or not the control system of the motor for the auxiliary machine is normal or abnormal may comprise a rotation sensor detecting the rotation of the motor for the auxiliary machine, a rotation sensor detecting the rotation of the motor for driving the vehicle, and an abnormality determination device which determines that there is an abnormality in the control system of the motor for the auxiliary machine when the rotation speed of the motor for the auxiliary machine is less than or equal to a pre-set value during rotation of the motor for driving the vehicle. Since the motor for the auxiliary machine is normally driven when the vehicle is operating, it is possible to determine that there is an abnormality in the control system of the motor for the auxiliary machine, for example when the motor for the auxiliary machine is stopped while the motor for driving the vehicle is rotating.

Furthermore, in both the above inventions, it is possible to provide a warning device which outputs a warning when an abnormality in the motor for the auxiliary machine is detected. In this manner, it is possible to allow for timely repairs by notifying the driver with the warning that there is an abnormality in the control system of the motor for the auxiliary machine.

BEST MODE FOR CARRYING OUT THE INVENTION

Figures 1, 2:
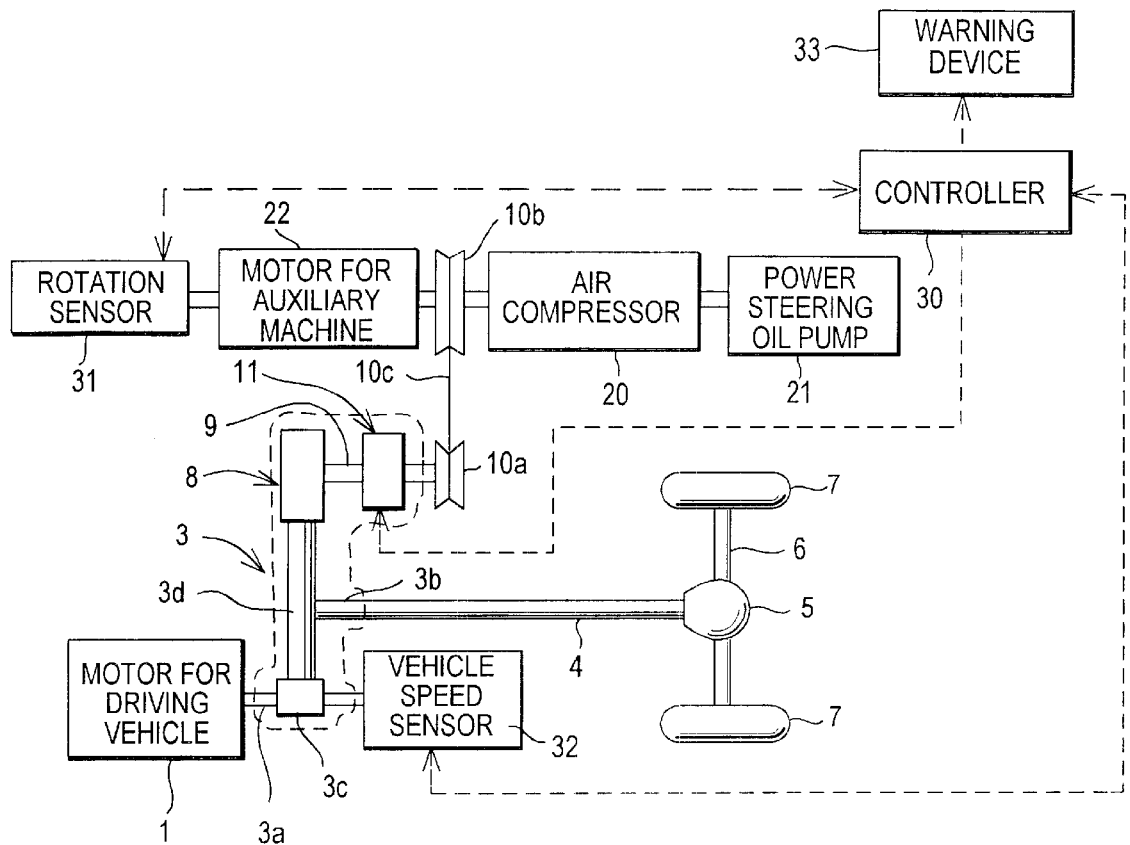
FIG. 1 is a schematic diagram showing agent of the present invention.
FIG. 2 is a table describing a control routine of a control device executing the above embodiment.

In FIG. 1, reference numeral 1 denotes a motor for driving the vehicle which acts as a prime mover. The motor 1 for driving the vehicle generates a drive force for operating the vehicle when supplied with electrical power. The drive force is output to a propeller shaft 4 through a reduction gear box 3 and is transmitted to the drive wheels 7 from a differential gear 5 through an axle 6. That is to say, the reduction gear box 3, the propeller shaft 4, the differential gear 5 and the axle 6 comprise a power transmission mechanism which transmits the output of the motor 1 for driving the vehicle to the drive wheels 7.

The reduction gear box 3 comprises an input shaft 3a which is connected to the motor 1 for driving the vehicle, an output shaft 3b which is connected to the propeller shaft 4, and a pair of gears 3c, 3d which mesh with each other at a fixed gear ratio between the shafts 3a, 3b. A gear 8 which meshes with the gear 3d of the output shaft 3b at a fixed gear ratio and a rotation shaft 9 which outputs the rotation of the gear 8 to the output side of the gear box 3 are also provided. A pair of pulleys 10a, 10b and a belt 10c which rotates the pulleys 10a, 10b in synchrony are disposed between the rotation shaft 9 and the drive shaft of the auxiliary machines 20, 21 which is described below. The pulleys 10a, 10b and the belt 10c together with the gear 8 and the rotation shaft 9 comprise a power extraction mechanism which transmits rotations from the power transmission mechanism to the drive shaft of the auxiliary machines 20, 21. A solenoid clutch 11 which enables or disenables the transmission of power is interposed along the rotation shaft 9.

Reference numeral 20 denotes an air compressor which acts as a source of air pressure which is supplied to the vehicle braking device. Reference numeral 21 denotes an oil pump which acts as a source of oil pressure which is supplied to the power steering device or the like. The respective drive shafts of these auxiliary machines 20, 21 are connected coaxially and the rotation shaft of the motor 22 for the auxiliary machines is connected to the drive shaft of the air compressor 20. The motor 22 for the auxiliary machines is continuously driven by a control device (not shown) while the vehicle is running and it is driven on predetermined conditions while the vehicle is stopped. For example, when the air pressure of the air tank is less than or equal to a predetermined air pressure, the motor 22 is driven even when the vehicle is stopped.

Reference numeral 30 denotes a controller which controls the engagement or disengagement of the solenoid clutch 11 and which functions both as a solenoid clutch control device and a determination device. A rotation sensor 31 which detects a rotation of the motor 22 for the auxiliary machines and a rotation (vehicle speed) sensor 32 which detects a rotation of the motor 1 for driving the vehicle are provided. The controller 30 determines whether or not there is an abnormality in the control system of the motor 22 for the auxiliary machines based on the detection signals from these sensors 31, 32. When it is determined that the control system of the motor 22 for the auxiliary machines is operating normally, the solenoid clutch 11 is maintained in a disengaged state. On the other hand, when the control system of the motor 22 for the auxiliary machines is operating abnormally, the solenoid clutch 11 is switched to an engaged state. The controller 30 operates a warning device 33 such as a buzzer or a lamp in order to generate a prescribed warning when it determines that the control system of the motor 22 for the auxiliary machines is operating abnormally.

FIG. 2 is a table describing the control routine performed by the controller 30 including the determination of an abnormality in the control system of the motor 22 for the auxiliary machines. When the motor 22 for the auxiliary machines is operating normally, it is continuously operated while the vehicle is running. While the vehicle is stopped, it is operated on the predetermined conditions.

Based on these premises, the controller 30 performs the determination routine of whether or not there is an abnormality in the control system of the motor 22 for the auxiliary machines. That is to say, the controller 30 determines that the control system of the motor 22 for the auxiliary machines is normal based on the detection signal from the rotation sensors 31, 32 when the motor 1 for driving the vehicle is stopped and the motor 22 for the auxiliary machines is stopped or rotating. At that time, the solenoid clutch 11 is maintained in a state of disengagement. In the same manner, it is also determined that the control system of the motor 22 for the auxiliary machines is normal when the motor 1 for driving the vehicle is rotating and the motor 22 for the auxiliary machines is rotating. In this case, the solenoid clutch 11 is maintained in a state of disengagement. In contrast, when the motor 1 for driving the vehicle is rotating and the motor 22 for the auxiliary machines is stopped, it is determined that there is an abnormality in the control system of the motor 22 for the auxiliary machines and the solenoid clutch 11 is maintained in a state of engagement.

With this arrangement, when it is determined that there is an abnormality in the motor 22 for the auxiliary machines when the vehicle is running, the solenoid clutch 11 is engaged and the rotation of the motor 1 driving the vehicle is transmitted to the drive shaft of the oil pump 21 for power steering and the air compressor 20 through the power extraction mechanism from the braking gear box 3. In this manner, even when the motor 22 for the auxiliary machines is stopped, it is possible to maintain supply of oil pressure used in the power steering device and air pressure used in the braking device because the air compressor 20 and the oil pump 21 are driven by the rotation of the motor 1 for driving the vehicle. Furthermore at that time, since the warning device 33 in the driver's compartment is operated, it is possible to notify the driver immediately of abnormality in the control system of the motor 22 for the auxiliary machines. When the control system of motor 22 for the auxiliary machines is operating normally, the solenoid clutch 11 is maintained in a disengaged state. At this time, the air compressor 20 and the oil pump 21 for the power steering are driven by the drive force of the motor 22 for the auxiliary machines.

Figure 3:
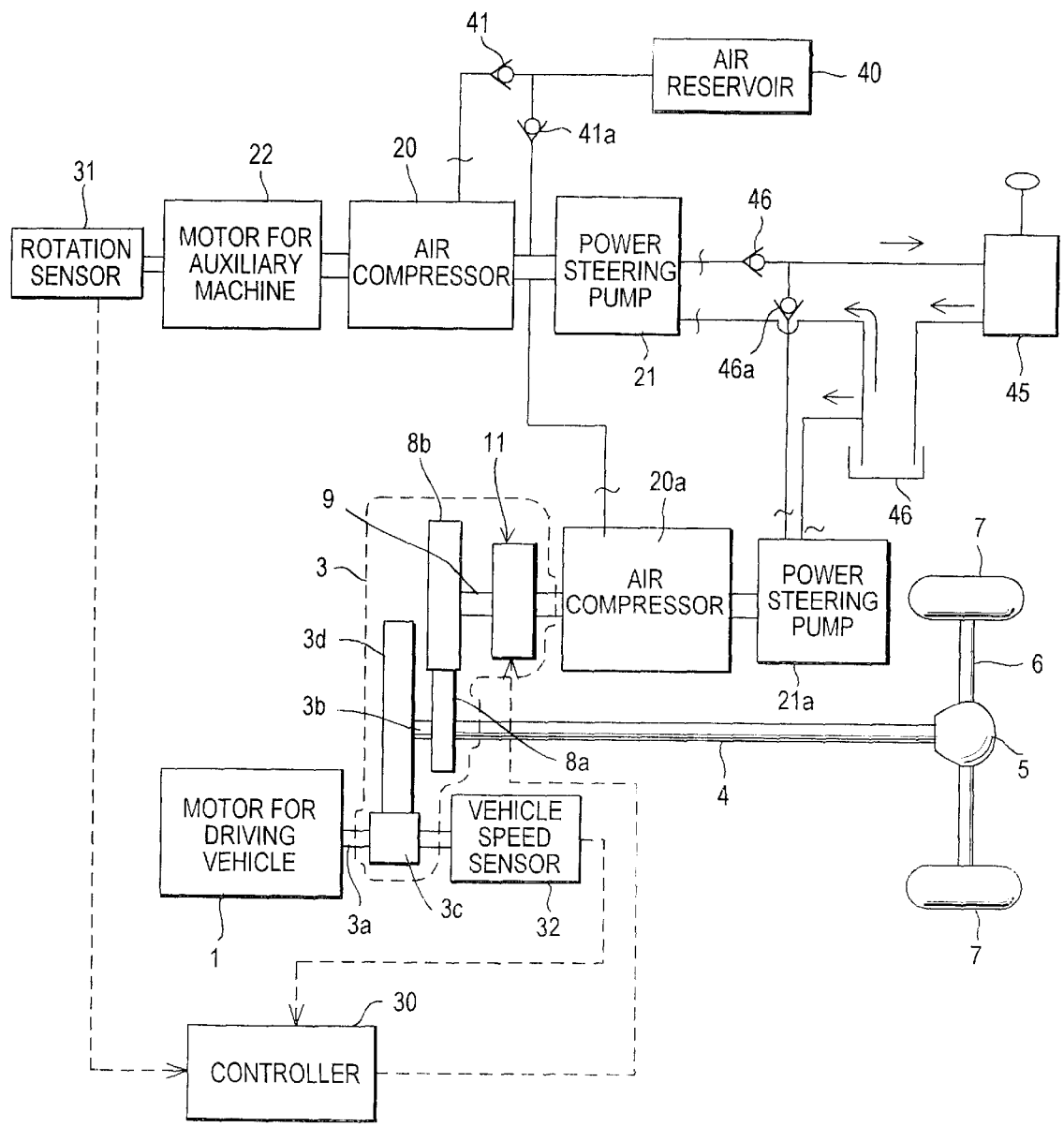
FIG. 3 is a schematic diagram showing another embodiment of the present invention.

FIG. 3 shows another embodiment of the present invention. In this embodiment, the reduction gear box 3 comprises a pair of gears 8a, 8b which mesh with each other at a fixed gear ratio between the output shaft 3b and the rotation shaft 9. As spare auxiliary machines, the oil pump 21a for power steering and the air compressor 20a coaxially connect with the rotation shaft 9 on an outer section of the gear box 3. That is to say, the spare oil pump 21a and air compressor 20a are connected to the output shaft 3b of the gear box 3 through a power extraction mechanism comprising a pair of gears 8a, 8b and a rotation shaft 9. A solenoid clutch 11 engaging or disengaging power is interposed along the rotation shaft 9. A controller 30 is provided to control the solenoid clutch 11 as shown in FIG. 2. Those components of FIG. 3 which are common to FIG. 1 are designated by the same reference numerals.

With this arrangement, when the controller 30 determines that there is an abnormality in the motor 22 for the auxiliary machines when the vehicle is running, the solenoid clutch 11 is engaged and the spare oil pump 21a for power steering and the spare air compressor 20a are driven by a rotational output from the reduction gear box 3 through the power extraction mechanism. In this manner, even when the motor 22 for the auxiliary machines is stopped, the spare auxiliary machines 20a, 21a can maintain supply of oil pressure for power steering and air pressure for braking because they are operated by the rotations of the motor 1 for driving the vehicle. When the control system of the motor 22 for the auxiliary machines is normal, the solenoid clutch 11 is maintained in a disengaged state and the auxiliary motors 20, 21 are driven with the drive force of the motor 22 for the auxiliary machines.

In FIG. 3, the air compressor 20, 20a are connected by piping in parallel with respect to the air tank 40. When one of the air compressors 20, 20a is driven, air pressure is supplied to the air tank 40. In order to prevent leakage of the air pressure through the other air compressor 20 or 20a which is stopped at that time, check valves 41, 41a are respectively interposed in a parallel section of piping. The piping for intake and outlet sections of the oil pumps 21, 21a are respectively disposed in parallel to the power steering mechanism 45 and the oil pump 46. When one of the oil pumps 21, 21a is driven, oil pressure is supplied to the power steering mechanism 45. In order to prevent oil pressure escaping towards the side of low pressure through the other oil pump 21 or 21a which is stopped at that time, check valves 46, 46a are respectively interposed on the outlet side of the piping.

The solenoid clutch 11 may be connected as required and not only in the event of abnormality in the control system of the motor 22 for the auxiliary machines. In this case, the flow amount of compressed air to the air tank 40 and the flow amount of compressed oil to the power steering device 45 is increased because the two systems of auxiliary machines 20, 20a, 21, 21a operates at the same time. As a result, it is possible to quickly increase the air pressure of the air tank 40 and to increase the assist to the power steering device 45.

What is claimed is:

1. A drive device for an auxiliary machine in a vehicle, the vehicle having a motor for driving the vehicle, which acts as a prime mover for the vehicle, a power transmission mechanism, which transmits an output of the motor to drive wheels, and a motor for an auxiliary machine, which powers the auxiliary machine in the vehicle, comprising:

a power extraction mechanism, which transmits a rotation of the power transmission mechanism to a drive shaft of the auxiliary machine;

a solenoid clutch, which enables or disables the transmission of the rotation to the auxiliary machine by the power extraction mechanism;

a determination device, which determines whether a control system of the motor for the auxiliary machine is operating abnormally or normally; and a solenoid clutch control device which, on the basis of a determination result obtained by the determination device, disengages the solenoid clutch when the control system of the motor for the auxiliary machine is operating normally, and which engages the solenoid clutch when the control system of the motor for the auxiliary machine is operating abnormally.

2. The drive device for an auxiliary machine according to claim 1, wherein the auxiliary machine includes an oil pump acting as a source of oil pressure used in a power steering device, and/or an air compressor acting as a source of air pressure used in a vehicle braking device.

3. The drive device for an auxiliary machine according to claim 1, wherein the determination device that determines whether the control system of the motor for the auxiliary machine is operating normally or abnormally, comprises:

a first rotation sensor, which detects a rotation of the motor for the auxiliary machine;

a second rotation sensor, which detects a rotation of the motor for driving the vehicle; and an abnormality determination device, which determines on the basis of detection signals from the rotation sensors that there is an abnormality in the control system of the motor for the auxiliary machine, when a rotation speed of the motor for the auxiliary machine is less than or equal to a pre-set value when the motor for driving the vehicle is rotating.

4. The drive device for an auxiliary machine according to claim 1, further comprising a warning device which generates a warning when an abnormality is detected with respect to the motor for the auxiliary machine.

5. A drive device for an auxiliary machine in a vehicle, the vehicle having a motor for driving the vehicle, which acts as a prime mover for the vehicle, a power transmission mechanism, which transmits an output of the motor to a drive wheel, and a motor for an auxiliary machine, which powers the auxiliary machine in the vehicle, comprising:

a spare auxiliary machine;

a power extraction mechanism, which transmits a rotation of the power transmission mechanism to the spare auxiliary machine;

a solenoid clutch which enables or disables the transmission of the rotation to the spare auxiliary machine by the power extraction mechanism;

a determination device, which determines whether a control system of the motor for the auxiliary machine is operating abnormally or normally; and a solenoid clutch control device which, on the basis of a determination result obtained by the determination device, disengages the solenoid clutch when the control system of the motor for the auxiliary machine is operating normally, and which engages the solenoid clutch when the control system of the motor for the auxiliary machine is operating abnormally.

6. The drive device for an auxiliary machine according to claim 5, wherein the solenoid clutch control device has a structure in which the solenoid clutch can be forcibly engaged even when there is no abnormality in the control system of the motor for the auxiliary machine.

7. The drive device for an auxiliary machine according to claim 5, wherein the auxiliary machine includes an oil pump acting as a source of oil pressure used in a power steering device, and/or an air compressor acting as a source of air pressure used in a vehicle braking device.

8. The drive device for an auxiliary machine according to claim 5, wherein the determination device that determines whether the control system of the motor for the auxiliary machine is operating normally or abnormally, comprises:

a first rotation sensor, which detects a rotation of the motor for the auxiliary machine;

a second rotation sensor, which detects a rotation of the motor for driving the vehicle; and an abnormality determination device, which determines on the basis of detection signals from the rotation sensors that there is an abnormality in the control system of the motor for the auxiliary machine, when a rotation speed of the motor for the auxiliary machine is less than or equal to a pre-set value when the motor for driving the vehicle is rotating.

9. The drive device for an auxiliary machine according to claim 5, further comprising a warning device which generates a warning when an abnormality is detected with respect to the motor for the auxiliary machine.

* * * * *